April 19, 1955 R. PLATH 2,706,410
LIQUID QUANTITY INDICATING MEANS
Filed April 18, 1950 2 Sheets-Sheet 1

Robert Plath
  INVENTOR.
BY James M. Clark
HIS PATENT ATTORNEY.

April 19, 1955 R. PLATH 2,706,410
LIQUID QUANTITY INDICATING MEANS
Filed April 18, 1950 2 Sheets-Sheet 2

Robert Plath
*INVENTOR.*

BY *[signature]*
HIS PATENT ATTORNEY.

United States Patent Office 2,706,410
Patented Apr. 19, 1955

2,706,410

LIQUID QUANTITY INDICATING MEANS

Robert Plath, Wichita, Kans., assignor to Boeing Airplane Company, a corporation of Delaware Application April 18, 1950, Serial No. 156,603

16 Claims. (Cl. 73—290)

The present invention relates to means for indicating the liquid level or quantity of liquid in tanks and containers, and pertains more particularly to improvements in such means for use with liquid storage tanks of irregular shapes.

This invention is directed to the improvement in means for indicating the level or quantity of liquid within tanks of irregular or non-rectangular shapes. Such tanks are frequently used in aircraft within the wings or other portions of the vehicle in which the shape of the tank is made to conform generally with that of the particular body within which it is housed. When such tanks are installed in aircraft wings, they are of relatively shallow depth and the top and bottom walls of the tanks are frequently disposed at angular relationships with respect to the horizontal such as may be determined by the dihedral or slope of the wing, or other factors. This invention is also directed to the indication of the level or quantity of contents of such tanks when they are disposed at angular relationships to the normal flight attitude of the aircraft, such as when the same may be flown at either or both longitudinal and lateral angular dispositions from the normal horizontal flight attitude.

The present invention comprises essentially an improved liquid level or quantity indicating system consisting of one or more vertical measuring tubes or tubular elements disposed throughout the tank and define columns of liquid within their vertical heights. These tubular elements are provided with float-operated valves at their upper and lower ends for providing means to determine the outage or the empty air space above the liquid level, or the tops of the respective columns of liquid, from which the actual amount of liquid within the tank may be instantaneously determined or indicated. The single or several measuring elements are interconnected by communicating conduits to a displacement cylinder which is driven by a motor which in turn is magnetically coupled with a position indicating means, or position transmitter, whereby the liquid level or contents are indicated by movement of the piston of the displacement cylinder necessary to move a float element from the tank liquid level to the upper float valve position within the measuring elements at which predetermined pressures are developed within the indicating system. By means of a unique electrical system the position transmitting portion of the system is intermittently actuated and controlled to hold a quantity indicating gauge at a steady position between cycles of operation of the motor-driven displacement cylinder, thus giving a relatively steady reading.

It is, accordingly, a primary object of the present invention to provide an improved liquid quantity indicating system for storage tanks and containers, and particularly those of irregular shapes. It is a further object to provide such an improved system for tanks which are subject to displacement or tilting from their normal positions such as the fuel and oil tanks of aircraft and other vehicles. It is also an object of the present invention to provide a positive-acting and foolproof indicating system for aircraft tanks and the like which is not subject to improper indications due to vibration of the aircraft or to flight maneuvers which may cause excessive sloshing or splashing conditions of the liquid within the tank.

It is also an object of the present invention to provide a liquid quantity indicating system of an improved type in which a portion of the liquid within the tank is utilized to measure the outage of the tank from which the quantity within the tank may be instantaneously determined. A further object provides for improvements in such systems in which intermittent or periodic indications are made from an initial position of the measuring means and which thereby minimizes to a great extent the possibility of float elements, indicating pointers and other elements becoming jammed in positions at which faulty indications might be obtained. It is a still further object of the present invention to provide a liquid quantity indicating means in which the movable elements and operating mechanism disposed within the tank is simplified and the number of such elements reduced to a minimum. A corollary object of the invention resides in the provision of improved elements for indicating liquid levels and quantities as well as novel and improved pressure-actuated electrical means for controlling the operation of such elements and operating parts.

Other objects and advantages of the present invention will occur to those skilled in the art after reading the following description, when considered in conjunction with the accompanying drawings, forming a part hereof, in which.

Figure 1:
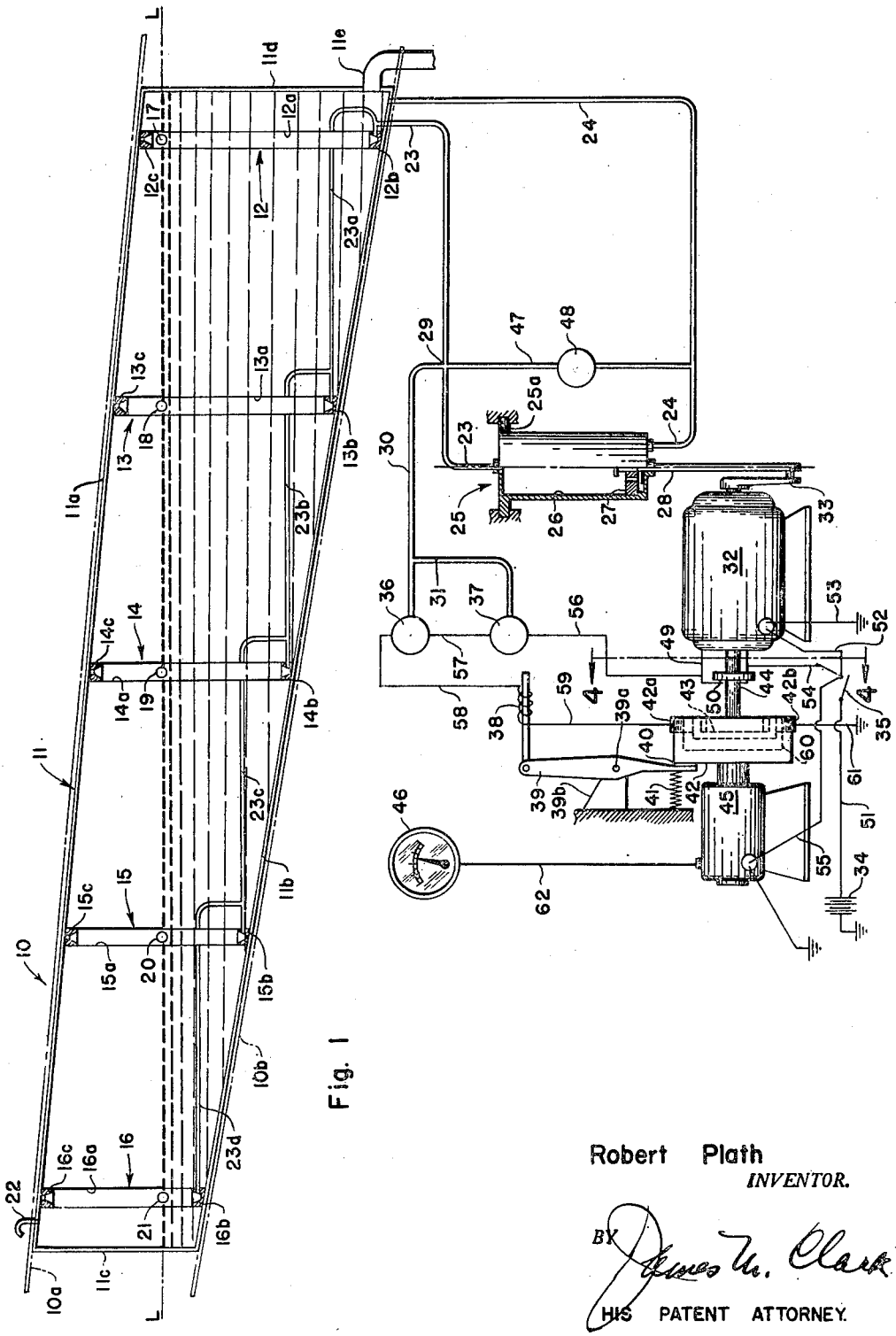
Fig. 1 is a conventionalized showing of a preferred form of the present improved indicating system as applied to an aircraft wing tank.

Referring now to Fig. 1, the numeral 10 indicates a wing of an airplane in which the angular relationship of the upper and lower surfaces 10a and 10b, respectively, indicate that the wing has appreciable dihedral, as well as thickness taper. The section through the wing shown in this figure is taken at a transverse plane and may be regarded as looking forward such that the fuselage or body portion would be to the right of the figure with the wing sloping upwardly and outwardly at a positive dihedral toward a tip portion which would be toward the left of this figure. The tank is represented by the numeral 11, having a top 11a and a bottom 11b, both of which may be either planar, or curved in the chordwise, or fore and aft direction, to conform with the profile or wing shape. The end walls 11c and 11d of the tank 11 are substantially vertically disposed and the tank is preferably provided with an outlet at its lower inboard portion as indicated at 11e. The latter may also be utilized as the filling inlet connection, or a separate inlet may be provided. It will be understood that the tank may be utilized to contain fuel, oil or other liquids, the level or contents of which it is desired to measure at any time.

The tank 11 is provided with a plurality of vertically disposed measuring tubes 12, 13, 14, 15 and 16. These tube elements are preferably equally spaced in the spanwise direction and it will be understood that, in tanks which are so shaped that the transverese sections in the fore and aft sense are also non-rectangular, it may be desirable that the tank may be provided with two or more rows of such tube elements. As shown in detail in Fig. 2, these tube elements may consist primarily of a cylindrical pipe or tube having a wall 13a, which extends vertically for the full height of the tank, being supported at the upper and lower tank walls 11a and 11b, the attachment at its upper terminal being slightly opened as at 13d to permit venting or escape of air from within the tube 13a to the air above the liquid and beneath the top plate 11a of the tank. Each tube contains a spherical ball float element floatingly carried at the top of the liquid column as indicated by the numerals 17, 18, 19, 20 and 21 in Fig.1 and as represented by the numeral 18 in the typical detail shown in Fig. 2. Apertured check valve elements 13b and 13c are provided within the tube 13a at its bottom and upper terminals, respectively. The valve elements 13b and 13c are provided with conical seats which are arranged to cooperate with the ball float 18 to close the bottom of the tube against outflow of liquid, or alternatively to close the upper terminal of the tube 13a against flow upwardly through the tube and into the tank 11. The upper valve fitting 13c is accordingly vented to the air in the top of the tank through the vent space 13d while the lower orifice 13b is connected to the pressure or discharge side of the pump or displacement cylinder 25 by means of the tubular conduit 23a and the main conduit 23. Each of the tube elements 12 to 16, inclusive, are substantially identical in their construction and details except that they vary in vertical dimension or height depending upon their position within the tank. They are, however, each provided with ball float elements 17 to 21, inclusive, lower valve fittings 12b, 13b, 14b 15b and 16b as well as upper valve fittings 12c, 13c, 14c, 15c and 16c. Each of the lower valve fittings is connected to the discharge line 23 from the displacement cylinder 25 by means of the respective branch conduits 23a, 23b, 23c and 23d. A vent 22 is preferably provided for the tank 11 at its upper outer portion, or at the highest point in the tank structure, to permit inflow or outflow of air from or to the atmosphere, or other space, when the contents of the tank are drained or refilled, respectively. The tank 11 is provided with an outlet connection at 11e, as referred to above, through which such draining or refilling may be accomplished. The displacement cylinder 25 comprises a cylinder portion 26 within the bore of which the piston 27 is reciprocally movable for actuation by the piston rod 28. The piston 27 is driven by an electric motor 32 through the crank arm 33 pivotally connected to the lower terminal of the piston rod 28. The motor 32 preferably drives the crank at a constant speed of approximately 2 R. P. M. and the upper portion of the cylinder 25 is pivotally mounted upon the trunnions 25a such that the lower end of the cylinder and the piston rod 28 may follow the circular path of the pivotal connection to the rotating crank 33. The upper and lower ends of the cylinder 26 are provided with discharge and return outlets, respectively, communicating with the conduits 23 and 24 which are preferably flexible in nature such that these conduits may follow the rocking motion of the displacement cylinder 25 as it is driven by the motor 32.

Figure 2:
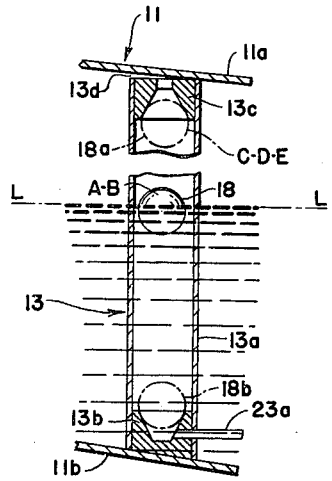
Fig. 2 is a detailed view of one of the float controlled measuring tubes shown in the tank of Fig. 1.

Referring now to the detail showing of the displacement cylinder 25 in Fig. 2, it will be noted that the piston 27 is apertured at 27a to permit by-passing or passage of fluids through the piston from one end of the cylinder 26 to the other. The piston rod 28 is provided with an end stop 28b and a transverse flange or valve plate portion 28a which is arranged to cooperate with the piston 27 and the apertures or ports 27a such that on the up-stroke from the full line position to the upper E-F construction line position, the piston 27 is forced upwardly by contact of the valve plate 28a of the piston rod 28, and the apertures 27a are closed against passage of fluid through the valved or ported piston. This valving arrangement, accordingly, permits the piston to displace or compress the fluid during the forward or upward stroke of the piston rod 28, but permits the opening of the apertures 27a during the return, or down stroke of the piston rod 28, as shown in the construction lines and position E-F in which the piston rod 28 has already started downwardly on the return stroke and the end stop 28b has just engaged the top face of the piston 27 to carry the same downwardly for the remainder of the down stroke. Inasmuch as the valve plate 28a on the piston rod 28 is of such diameter that it covers the orifices 27a and the smaller end plate or stop 28b does not cover the orifices, the valve means through the piston 27 is closed while the piston is moved upwardly and this valve means is open while the piston is moved downwardly. The lower end of the cylinder 26 is provided with a reduced diameter portion defined by the bottom shoulder 26a which limits the downward movement of the piston 27 while providing space for the valve plate 28a thereby insuring that the valve means within the piston remains open during the period of dwell of the piston travel at the lower end of the stroke of the piston rod 28, this position of the piston being indicated by the letters A-B in Figs. 3 and 5.

The pressure or discharge conduit 23 from the upper end of the displacement cylinder 25 communicates directly with the abovementioned branch pressure conduits 23a, 23b, 23c and 23d connected to the lower check valve elements 12b, 13b, 14b, 15b and 16b of the respective column elements. Within the discharge or pressure line 23 a cross fitting 29 is provided with branch pressure lines 30 and 31 communicating with the pressure switches 36 and 37. The pressure switch 36 is normally open at normal or equalized pressure and is closed when the pressure, developed within the cylinder above the piston 27 and within the pressure line 23 and its branches, reaches a predetermined magnitude. On the other hand, the pressure switch 37 is normally closed at the lower pressures and is opened only when the pressure developed by the piston 27 reaches a predetermined magnitude somewhat in excess or above that pressure at which the pressure switch 36 closes. The pressure switches 36 and 37 receive current from the battery 34, or other source of electrical energy, when the operating switch 35 is closed and the primary function of these switches is the energization or release of the solenoid 38 which controls the position and operation of the lever 39 for the brake 40. This brake lever 39 is pivotally mounted at the pivot 39a upon the supporting structure or bracket 39b, the brake lever 39 having a brake contact portion 40 engageable with the floating coil holder 42. The brake 40 is urged into engagement with the coil holder drum 42 by means of the compression spring 41 bearing against the lever 39 and is released from engagement only when the solenoid 38 is energized, thereby causing rotation of the lever 39 in the clockwise direction about its pivot 39a, overcoming the opposition of the compression spring 41.

Figure 4:
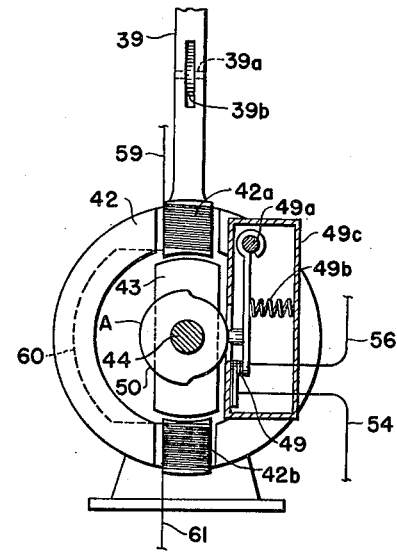
Fig. 4 is a detailed view as taken along the lines 4—4 of Fig. 1, showing a portion of the electrical control circuit and the magnetic coupling means between the displacement cylinder motor and the position transmitting means.

The motor shaft 44 has mounted on one of its terminals a permanent magnet 43 which is fixed to the shaft 44 to rotate therewith at the same speed as the crank 33. The permanent magnet 43 is more clearly shown in detail in Fig. 4, being fixedly attached to the motor shaft 44 such that it rotates within the drum 42 between the positioning coils 42a and 42b. It will, accordingly, be understood that once the switch 35 is closed the motor 32 will rotate continuously at a speed of approximately 2 R. P. M. carrying the magnet 43 with it at the same speed whereas the positioning coil holder 42 which is magnetically coupled with the magnet 43 by means of the coils 42a and 42b and the pole elements with which they are associated will only be permitted to rotate with the magnet 43 at such times as the solenoid 38 is energized and releases the brake 40 from engagement with the coil holder 42. When the brake is disengaged or released and the coil holder 42 is free to move with, or move to, the position of the magnet 43, the rotation of the coil holder 42 is transmitted through the position transmitter 45 and such position (which corresponds to the amount of fluid required to raise the floats 17 to 21, inclusive, from the level of the liquid to the top of each column element) is transmitted electrically through the cables 62 and is indicated on the dial at 46. It will be understood that, while the amount of fluid displaced by the cylinder 25 necessary to move each float element from the liquid level to the top of the respective tubes actually represents the outage of the tanks, it is only necessary to reverse or set the scale on the dial such that the remaining contents of the tank, namely, the actual liquid contents, is indicated on the dial. A fluid conduit 47 is connected to the high pressure discharge line 23 from the displacement cylinder 25 at the cross fitting 29, being in communication with a pressure relief valve 48 which permits the return of fluid at pressures in excess of a predetermined magnitude, to the return line 24 from which the fluid may be returned to the suction side of the displacement cylinder 25 or to the bottom of the tank 11.

As indicated above, the electrical system receives its energy from the storage battery, or other source, 34 when the switch 35 is closed and a circuit breaker 49 is disposed in series with the pressure switches 36 and 37 as well as the brake solenoid 38, the breaker being disposed such that it is actuated by the cam 50 carried upon the shaft 44 of the motor 32. The battery 34 and the switch 35 are interconnected by the line 51 such that, upon closing the switch 35, current flows through the line 52 to the motor 32 returning to the ground through the line 53, thereby causing rotation of the motor 32. With the switch 35 closed, current also flows through the line 54 to the breaker 49, thence to the line 56 to the pressure switch 37, through the line 57 through the pressure switch 36 and thence through the line 58 to the solenoid 38. From the solenoid the circuit runs to the coils 42a and 42b through the line 59 and from these coils to the ground through the line 61, this portion of the circuit either being of flexible cables or of a suitable slip-ring type to permit rotation of the coil holder 42 without interruption of the flow of current through this portion of the circuit. The pole coils 42a and 42b are interconnected in series by means of the line or conductor 60 which is carried by and rotates with the coil holder 42. Closing of the switch 35 also serves to energize and place into operation the position transmitter 45 and the indicator for the quantity gauge at 46 by flow of current through the line 55 to the transmitter 45 and thence to the ground.

Figure 5:
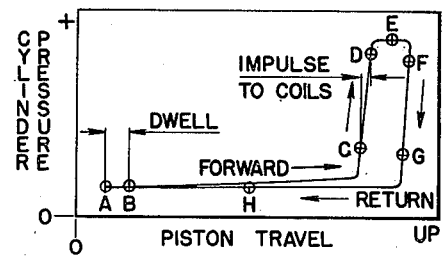
Fig. 5 is a diagrammatic chart indicating the relationship of the cylinder pressure and piston travel throughout a cycle of operation of the indicating system.

The operation of the indicating system, which will be more clearly understood by reference to the diagrammatic chart in Fig. 5, as well as the component elements of the system as shown in Fig. 1, is as follows: Let us assume that the level of the liquid as indicated in the tank of Fig. 1 is indicated as shown by the level at L, and the switch 35 is closed to obtain an indication of the capacity of the tank at the level shown. Let us also assume that the motor 32 starts from its bottom or initial position of the crank 33 as shown in Fig. 1 corresponding to the middle of the dwell position between the piston travel from B to A to B as shown on the chart in Fig. 5. It will be understood that, due to the travel of the piston with respect to the piston rod and the large angular travel of the crank at the end of the return stroke and the start of the forward stroke, there is provided a period of dwell which permits the stabilization of the fuel level at the beginning of each cycle. This dwell period, accordingly, is comprised of the last portion of the return travel of the piston and the initial portion of the forward travel of the piston being indicated at positions A-B in Figs. 2 and 3 by the corresponding positions of the float ball 18 and the piston rods 27 and 28, as well as being shown in Fig. 5. With the piston rod 28 in the region of its lowermost position as shown in Fig. 1, and as indicated in the construction lines at position A-B in Fig. 3, the ports 27a are open and the fluid within the system is equalized such that the pressure is the same on opposite sides of the piston 27, and the only differences in pressure throughout the system are those due to the static head caused by the weight of the liquid. As the piston rod 28 is caused to move upwardly from its initial or bottom terminal position, it moves relative to the piston 27 until its valve plate 28a closes the ports 27a and lifts the piston upwardly through its forward or pressure stroke. At the start of the upward or forward stroke of the piston 27 it will be understood that the breaker 49, the pressure switches 36 and 37, as well as the solenoid 38 and the coils 42a and 42b are all in circuit with the energy source 34, the switch 35 having been closed. It will also be understood that at this part of the cycle of operation, past position H on the chart of Fig. 5, the cam 50 is in the position shown in Fig. 4 in which the breaker 49, pivotally mounted at 49a within the housing 49c, is urged into its closed position by the compression spring 49b. Also at this initial stage of the operation, before any pressure has been created by the upward movement of the piston 27 within the cylinder 26, the pressure switch 36 is in its normally "open" position and the pressure switch 37 is in its normally "closed" position.

As the piston 27 moves upwardly within the cylinder 26 it forces the column of fluid ahead of it out through the pressure line 23 and into the bottom fittings 12b, 13b, 14b, 15b and 16b, forcing this fluid into the bottom of the respective tubes 12, 13, 14, 15 and 16 and causing the ball floats 17, 18, 19, 20 and 21 to be carried upwardly with the rising level of the columns of fluid in each tube element. As the fluid is forced ahead of the upwardly moving piston 27 it is also permitted to flow from the sump of the tank 11 to the return line 24 into the space on the trailing or suction side of the piston 27. Due to the shorter distance through which the ball float 17 is required to move to the top of the tube 12, as compared to the ball float 18 within the tube 13, and the others, the ball float 17 will be the first to reach the top or the outlet valve fitting 12c of the tube 12 in which it cuts off the continued flow of liquid as it reaches the top of this tube. As soon as this occurs all of the displaced fluid from the cylinder 25 will pass through the branch conduit 23a to the remaining tubes 13 to 16, inclusive, until all of the ball floats 18 to 21, inclusive, successively reach the tops of their respective tubes 13 to 16 and oppose further filling of the group of tubes. At this point an abrupt rise occurs in the pressure of the fluid on the displacement side of the piston 27 due to the opposition to further flow and as the pressure rises and reaches a predetermined value, as indicated at C in Figs. 3 and 5, the pressure switch 36, which had heretofore been open, now closes and completes the circuit through the solenoid 38 thereby releasing the brake 40 from engagement against the coil holder 42. With the latter now free to float or rotate to follow and align itself with the position of the magnet 43, which is slowly rotating with the motor 32, the electromagnetic coupling between the holder 42 and the magnet 43 is temporarily established and the position of the magnet 43 is transmitted through the position transmitter 45 and translated into the level or gallonage, or other capacity of the liquid on the dial 46.

At this stage of the forward piston travel the pressure rises very rapidly for a relatively small piston travel, due to the relative incompressibility of the liquid stored within the tank and utilized in the indicating system and shortly after the pressure switch 36 is closed, initiating operation of the position transmitter portion of the system, the pressure reaches that magnitude at which the normally closed pressure switch 37 is opened, thereby de-energizing the solenoid 38 and permitting the brake 40 to again be applied to the coil holder 42. The re-engagement of the brake 40 with the coil holder 42, accordingly, provides a holding means for the position transmitter 45 such that the pointer on the scale of the indicator 46 is held at the position indicating the capacity resulting from the given displacement of the cylinder 25 necessary to fill the top portions of the plurality of tube elements. The point at which the pressure switch 37 is opened is indicated by the letter D on the chart in Fig. 5 near the top of the rise in pressure and this will occur shortly below the top of the stroke of the piston rod 28 or travel of the piston 27 between E and F on the chart. In the region of the end of the forward or upward stroke of the piston 27 and just prior to the return stroke of the piston rod 28, the raised portion of the cam 50 will engage and cause the opening of the breaker 49. Inasmuch as the breaker remains open for almost all of the full return stroke, or approximately for one half of the cycle of operation (between positions E and H on the chart) it insures that the circuit to the holding brake solenoid 38 is opened during the return phase of piston travel. Thus the solenoid cannot be energized for disengagement of the brake and the breaker prevents any electrical impulse during pressure drop-off at completion of the displacement stroke as well as preventing disturbance to the reading established by the position transmitter 45 and the associated positioning coils 42a and 42b. The point at which the breaker will be opened is indicated generally by the letter E in the chart in Fig. 5, and beyond this point the pressure falls off very rapidly to its initial equalized pressure. However, in dropping initially, as it reaches the pressure corresponding to that indicated by the letter F in the chart, the pressure switch 37 again closes to reach its normal low pressure setting and as a result of a further drop in pressure, corresponding to position G, the pressure switch 36 again opens to regain its initial low pressure setting.

Figure 3:
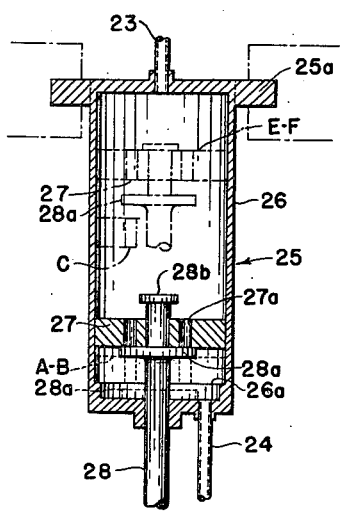
Fig. 3 is a detailed view of the fluid displacement cylinder of the indicating system shown in Fig. 1.

As the piston rod 28 starts downwardly on its return stroke, it moves downwardly ahead of the piston 27 as indicated by the construction lines corresponding to positions E—F in Fig. 3, and the corresponding positions in the chart, until the terminal flange 28b engages the upper face of the piston and moves the same downwardly with the piston rod. As the valve plate 28a moves away from the piston the ports 27a are opened and the fluid system is again equalized permitting the very rapid drop in pressure shown at the right side of the chart in Fig. 5, through the positions F and G, which rapid drop occurs during a relatively short distance of return piston travel. The pressure of the fluid is, accordingly, rapidly equalized on both sides of the piston 27 with the result that the ball floats 17 to 21, inclusive, float downwardly upon the surfaces of the receding or falling columns of fluids in the respective tube elements 12 to 16, inclusive. During this stage of the cycle, the fluid returns to the pressure line into the top of the cylinder 25 and moves outwardly from the bottom portion of the cylinder and upwardly through the return line 24 to the bottom of the tank, the fluid again seeking its natural level within the tank and within each of the tubes 12 to 16, inclusive. As the motor-driven crank 33 again moves downwardly toward the bottom of its stroke to the starting position the rotating cam 50 again passes through that position at which the breaker 49 is closed and remains closed throughout the latter portion of the return stroke and throughout the full forward stroke during which it keeps the circuit closed such that the pressure switches 36 and 37 can function to release and apply the brake 40 in rapid succession to take successive readings on the capacity or contents of the tank.

The functioning of the position transmitter 45, the coils 42a, and 42b, as well as the coil holder 42 is as follows: When the brake 40 is released the coils 42a and 42b and the coil holder 42 seek to align themselves with the magnet 43, and the coil holder 42 will follow the magnet 43 for the brief instant that both pressure switches 36 and 37 are closed as the pressure is increasing. Therefore if no fuel has been used in between readings, the coil holder 42 will first rotate in a direction opposite to the direction of the magnet 43 to line itself up with the magnet position at the time that the pressure switch 36 closes; the coil holder 42 will then follow the magnet 43 until the pressure switch 37 opens; and then the coil holder 42 will remain locked in place (by the brake 40 stopping the coil holder) at that point until the switch 36 closes again during the subsequent cycle. It should be borne in mind, however, that the fuel is practically incompressible and when the last tank column is filled, the pump output has no place to go, and consequently the pressure rises so rapidly that an extremely short interval of time exists between the closing of the pressure switch 36 and the opening of the pressure switch 37. Because of the brevity of this period, and the inertia of the switches 36 and 37 and the brake solenoid 38, there is relatively little or no reversal of direction of the coil holder 42 at this point in the cycle. It should also be noted that the exact motion of the coil holder 42 is dependent upon the following factors (1) change if any (and direction of change) in the amount of fuel in the tank since the last cycle; (2) inertia of the pressure switch 36; (3) inertia of the pressure switch 37; (4) inertia of the brake release solenoid 38; (5) inertia of the coil holder 42; and (6) inertia of the position transmitter 45. Inasmuch as the period of release of the brake 40 is relatively short and the various inertias are probably the same for each cycle, it is only important that the system be designed to allow enough time for the coil holder 42 to match the position of the magnet 43 at the same part of the pressure rise at each cycle.

In the event the liquid level should fall from the level L shown in Fig. 1, to a point below the bottom of the upper tube 16, the ball float 21 will drop into the valve fitting 16b and on displacement strokes of the piston 27 within the cylinder 25 the entire tube 16 will be filled with fluid as the ball float is caused to move between the lower fitting 16b and the upper fitting 16b. This will, of course, also apply to the successive tubes 14, 15, etc., as the liquid within the tank 11 is consumed by the power plant or is otherwise discharged from the tank. On the other hand as the tank may be filled above the level indicated by the letter L, the ball float 17 will engage in the valve fitting 12c and measured displacement over such a higher level will not require the successive filling and emptying of the lower tube 12. This will, of course, also apply as the tank may be filled to greater extents or heights with the successively higher tubes being utilized, and for readings of a tank which is substantially filled the displacement may be made entirely within the last or higher-most tube 16. Under such conditions where the volume displaced from the cylinder 25 is relatively small and the piston travel remains the same as for other readings, it is possible that fluid pressures in excess of the setting of the relief valve 48 may be reached and when such pressures are attained, the relief valve 48 opens and they are returned to the low side of the cylinder, as well as to the tank, to prevent damage to the components of the indicating system.

While a motor speed of approximately 2 R. P. M. has been established to give satisfactory results with indication of the contents twice every minute it will be obvious that this speed can be changed to suit varying conditions and different installations. The system is also adapted for use with rectangular shaped tanks in which but one measuring tube may be installed centrally within the tank. It will also be obvious that the ball floats within the tubes in the present system represent the only moving parts which are caused to be moved within the fluid portions of the system by the displacement cylinder. These ball floats, in addition to closing the upper valves of the tubes when the liquid level reaches the top of each tube, and closing the lower valves, also serve to maintain the conduits full of fluid and prevent air from being sucked into the operating part of the hydraulic system. It will also be understood that other means for coupling the displacement drive motor and the position transmitting means may be provided as well as other mechanisms for actuation of the breaker which prevents electrical impulses during pressure drop-off at completion of the displacement stroke. The release of the brake permits positioning of the coil holder relative to the rotating magnet at the time of the cylinder pressure surge thereby permitting rapid setting of the indicator needle through the position transmitter. Upon application of the holding brake the indicator needle is held very steady between impulses and overrunning of the permanent magnetic rotor which is constantly driven by the motor at crank speed prevents damage to the mechanism and provides a high degree of flexibility for the installation. The position indicating portion of the system is preferably such that upon opening of the switch 35 the needle of the indicator will return to zero to prevent giving a false reading after the system is shut off.

The displacement cylinder 25 is in effect a single-acting piston pump which can produce pressure only on its upward stroke and the valve plate 28a may be preferably be provided with a rubber or composition disk to improve its seating against the piston 27 and assist in its developing and maintaining higher fluid pressures in this connection. It is also pointed out that, inasmuch as the operative portion of the fluid or hydraulic system utilizes the same fluid which is stored in the tank with which it is constantly being intermixed and changed, slight losses due to leakage or other causes have no effect upon the operation of the system inasmuch as it has an ample supply for operating purposes whenever there is a measurable quantity of fluid within the tank.

Other forms and modifications of the present invention which may occur to those skilled in the art after reading the present description are intended to come within the scope and spirit of this invention as hereinafter more particularly set forth in the appended claims.

I claim:

1. In an indicating system for a storage tank having a non-horizontal bottom, vertically disposed tubes extending from the bottom to the top of said tank such that the bottoms of said tubes are disposed at different elevations, valve means at the upper and lower ends of each tube, float means disposed within each tube movable with the liquid level therein arranged for closing either of said valve means when reached by the level of the liquid within said tubes, displacement means in fluid communication with the lower portion of said tank and with the lower end of said tubes for raising the level of the liquid within said tubes said float means cooperating with said lower valves in each said tube arranged to establish an initial constant reference point for said displacement means corresponding to the level of the liquid in said tank, said displacement means containing equalization means for allowing the liquid in the tubes to reach the level of the liquid in the surrounding tank, and means actuated by the closing of the upper valve means by said float means for indicating the liquid level within said talk by the extent of movement of said displacement means.

2. In an indicating system for a tank, tube means supported in a vertical position with respect to said tank, float means disposed within said tube means movable vertically therein with the liquid level in said tank, valve means at the upper and lower ends of said tube means arranged to be alternately opened and closed by said float means dependent upon the liquid level in said tank, the upper end of said tube means being open to the interior of said tank, displacement means in fluid communication with the bottom of said tank and with the lower end of said tube means, said displacement means including a normally closed by-pass valve operative in the at rest condition of said displacement means to equalize the level of the liquid inside and outside said tube means, and indicating means operatively associated with said displacement means initiated by the extent of the movement of said displacement means necessary to fill the remainder of said tube means above the liquid level with liquid from said tank as determined by the closing of said upper valve means by said float means.

3. In an indicating system for a storage tank for liquids, tubular means disposed vertically within said tank, valves disposed at the upper and lower ends of said tubular means, float means disposed within said tubular means vertically movable with changes in liquid level of said tank, said float means arranged for closing the respective valves when the liquid level within said tubular means reaches either said valve, fluid displacement means including a valved piston telescopically slidable within a cylinder, a first fluid conduit interconnecting the discharge side of said fluid displacement means with the bottom of said tubular means, a further fluid conduit interconnecting the interior of said tank with the suction side of said fluid displacement means, said valved piston arranged upon engagement with an end of said cylinder to open to allow fluid communication between said fluid conduits for equalization of the fluid level within said tank and within said tubular means, pressure-actuated indicating means operatively connected to said valved piston and motor means operatively connected to said valved piston for moving said piston from said position and closing said valved piston to cut off said fluid equalizing interconnection and to displace a predetermined quantity of fluid to fill the upper portion of said tubular means for indicating the fluid contents within said tank.

4. In an indicating system for, a fluid storage tank having a non-horizontal bottom, a plurality of tubes supported vertically within said tank extending from the bottom to the top of said tank in such manner that the bottoms of said tubes are disposed at different elevations, valves disposed at the upper and lower terminals of said tubes in the regions of the high and low levels of liquid within said tank, float means movably supported within said tubes for closing either said valve when the liquid level reaches the level of said valves, said upper valve being open to the air space in the region of the top of said tank, said lower valve having a fluid conduit means connected thereto, displacement means arranged for discharge of fluid to said conduit means, further conduit means interconnecting said displacement means with the bottom of said tank said float means cooperating with said lower valves in each said tube arranged to establish an initial constant reference point for said displacement means corresponding to the level of the contents in said tank, said lower valve conduit means and said further conduit means being interconnected by said displacement means, and means coupled to said displacment means initiated by the reaching of a predetermined fluid pressure within said tubes for indicating the displacement of said displacement means and the level of the contents in said tank.

5. In an indicating system for fluid storage tank, a tube vertically supported with respect to said storage tank, valves disposed at the upper and lower ends of said tube, a ball float within said tube arranged to move with the level of fluid within said tube for closing engagement with either said upper or lower valves, a displacement piston-cylinder means, fluid conduits connecting the discharge side of said piston-cylinder means with the lower end of said tube, conduit means connecting the opposite side of said piston-cylinder means with the bottom of said storage tank, normally closed valve means carried by said piston-cylinder means for opening and equalizing the fluid level within said tank and within said tube at a predetermined position of said piston-cylinder means wherein the piston is at rest at the end of the cylinder, and means operatively connected to said piston cylinder means for measuring the stroke necessary to raise the level of the liquid within said tube to the top of said tube at which said float means closes said valve for indicating the quantity of liquid within said storage tank.

6. In an indicating system for a liquid storage tank, tube means vertically disposed within said tank, valve means disposed at the upper and lower terminals of said tube means, float means movably carried within said tube means for closing either said valves when the respective valve is reached by the fluid level within said tube means, displacement means of the piston-cylinder type having its discharge side in fluid communication with said lower valve means and its return side in fluid communication with the contents of said storage tank, said displacement means including a normally closed by-pass valve operative in the at rest condition of the piston of said displacement means to equalize the levels of the liquid inside and outside said tube means, means for moving the piston of said displacement means for raising the fluid level within said tube means and pressure sensitive means coupled with said displacement means initiated by predetermined pressure increase on the discharge side of said displacement piston resulting from closing of said upper valve means for indicating the extent of movement of said piston and the fluid contents of said storage tank, said float means and said lower valve arranged to close the fluid communication to the discharge side of said displacement means upon return movement of the piston during lowered levels of the liquid in said storage tank.

7. In an indicating system for a storage tank for liquids, a tube disposed within said tank, valves disposed at the upper and lower terminals of said tube, float means movably carried within said tube for closing either of said valves as the liquid level within said tube reaches the respective valve, fluid displacement means including a cylinder having a piston reciprocably mounted therein having its discharge side in communication with the lower float valve of said tube and having a suction side in fluid communication with the contents of said tank, normally closed valve means carried by said piston for permitting equalization of the liquid level within said tank and within said tube at an initial position of said piston in engagement with an end of said cylinder, a motor operatively connected for driving said piston, a position indicator releasably coupled to said motor and pressure responsive means initiated by closing of said upper valve upon movement of said piston from its initial position for actuating said position indicating means as determined through its couple with said motor for indicating the contents within said storage tank.

8. In an indicating system for a liquid storage tank, tube means vertically disposed within said tank, valve means for controlling flow through the upper and lower portions of said tube means, said upper valve means being open to the interior of said tank, float means movably carried within said tube means for closing either said valve means when the respective valve is reached by the fluid level within said tube means, displacement means of the piston-cylinder type having its discharge side in fluid communication with said lower valve means and its return side in fluid communication with the contents of said storage tank, means for moving the piston of said displacement means for raising the fluid level within said fluid measuring means, means initiated by predetermined pressure increase on the discharge side of said displacement piston resulting from closing of said upper valve means for indicating the extent of movement of said piston and the fluid contents of said storage tank, and means including a valve carried by said piston for effecting equalization of the pressures on each side of said piston when the same is returned to its initial position for restoration of the liquid level within said fluid measuring means, said float means and said lower valve means cooperating to seal the discharge side of said displacement means during return movement of said piston.

9. In an indicating system of the fluid displacement type for a storage tank, tube means disposed within said tank, valve means disposed adjacent the upper and lower portions of said tube means, float means disposed within said tube means operatively engageable with either said valve means for closing the respective valve as said liquid level reaches that valve, fluid displacement means including a cylinder having a piston reciprocably mounted therein in communication with said lower valve means and with the contents of said storage tank externally of said measuring means, magnetic means movable with said motor-driven piston, position transmitting means rotatable with said magnetic means for indicating the position of said motor-driven piston, said piston having operatively carried thereon normally closed by-pass means automatically opened upon said piston engaging an end of said cylinder for permitting the liquid level in the surrounding tank, and electrical means initiated by the reaching of a predetermined pressure within the discharge portion of said displacement means upon closing of said upper valve means by said float means for actuating said position indicating means in cooperation with said magnetic means for indicating the position of said piston and the liquid contents of said tank.

10. In a tank indicating system of the fluid displacement type, tubular means vertically disposed within said tank, valve means disposed adjacent the upper and lower terminals of said tubular means, float means disposed within said tubular means operatively engageable with said valve means for closing the respective valve as said liquid level reaches that valve, fluid displacement means in communication with said lower valve means and with the contents of said storage tank externally of said tubular means, said displacement means containing equalization means for permitting the liquid in said tubular means to reach the level of the liquid in the surrounding tank, a motor-driven piston operatively movable with said displacement means, magnetic means movable with said motor-driven piston, position transmitting means rotatable with said magnetic means for indicating the position of said motor-driven piston, electrical means initiated by the reaching of a predetermined pressure within the discharge portion of said displacement means upon closing of said upper valve means for actuating said position indicating means in cooperation with said magnetic means for indicating the position of said piston and the liquid quantity within said tank, and holding means operatively initiated by said pressure-actuated electrical means for retaining the position of said indicating means during continued operation of said motor and further movements of said piston and said magnetic means.

11. In a tank indicating system of the fluid displacement type, tubular means disposed within said tank, valve means disposed adjacent the upper and lower terminals of said tubular means, float means disposed within said tubular means operatively associated with said valve means for closing the respective valve as said liquid level reaches that valve, fluid displacement means in communication with said lower valve means and with the contents of said storage tank externally of said measuring means, a motor-driven piston operatively movable with said displacement means, magnetic means movable with said motor-driven piston, position transmitting means rotatable with said magnetic means for indicating the position of said motor-driven piston, electrical means initiated by the reaching of a predetermined pressure within the discharge portion of said displacement means upon closing of said upper valve means for actuating said position indicating means in cooperation with said magnetic means for indicating the position of said piston and the liquid quantity within said tank, holding means operatively initiated by said pressure-actuated electrical means for retaining the position of said indicating means during continued operation of said motor and further movements of said piston and said magnetic means, and equalization means carried by said motor-driven piston for equalizing the pressures within said tubular means and within said tank for return of said liquid level within said tubular means at an initial position of said motor-driven piston at which said holding means retains the previously indicated contents of said storage tank.

12. In an indicating system of the fluid displacement type for a tank, tubular means operatively associated with said storage tank, valve means disposed adjacent the upper and lower terminals of said tubular means, float means disposed within said tubular means operatively associated with said valve means for the closing of the respective valves as said liquid level reaches that valve, fluid displacement means in communication with the said lower valve means and with the contents of said storage tank externally of said measuring means, said displacement means containing equalization means for allowing the liquid in said tubular means to reach the level of the liquid in the surrounding tank, a motor-driven piston operatively movable with said displacement means, magnetic means movable with said motor-driven piston, position transmitting means rotatable with said magnetic means for indicating the position of said motor-driven piston, electrical means initiated by the reaching of a predetermined pressure within the discharge portion of said displacement means upon closing of said upper valve means for actuating said position indicating means in cooperation with said magnetic means for indicating the position of said piston and the liquid within said tank, holding means operatively initiated by said pressure-actuated electrical means for retaining the position of said indicating means during continued operation of said motor and movement of said piston and magnetic means, equalization means carried by said motor-driven piston for equalizing the pressures within said tubular means and within said tank for return of said liquid level within said tubular means at an initial position of said motor-driven piston at which said holding means retains the previously indicated contents of said storage tank, and a cam-actuated circuit breaker operatively actuated upon rotation of said motor for preventing electrical impulses and release of said holding means during pressure drop-off at the completion of the displacement movement of said motor-driven piston.

13. A system for determining the contents of a fluid tank having a non-horizontal bottom, the system comprising vertically disposed tubes extending from the bottom to the top of said tank, in such manner that the bottoms of said tubes are disposed at different elevations, each said tube having float-controlled terminals contiguous to the upper and lower walls of said fluid tank, fluid displacement means including a motor driven piston for raising the level of the liquid within said tubes, conduit means interconnecting said displacement means with said tank and with each said tube, said lower float-controlled terminals of said tubes cooperating with said fluid displacement means and with said conduit means to establish an initial constant reference point for said displacement means corresponding to the level of the contents in said tank, said displacement means containing equalization means for allowing the liquid in said tubes to reach the level of the liquid in the surrounding tank, and electrical means operatively actuated by movement of said liquid reaching said upper float-controlled terminals of said tubes under the influence of said displacement means for indicating the contents of said fluid tank.

14. A system for indicating the contents in a fluid tank having non-parallel top and bottom walls inclined to the horizontal, a plurality of tubes extending co-extensively with the depth of said storage tank at spaced intervals in such manner that the bottoms of said tubes are disposed at different elevations, each said tube having its upper terminal open to the interior of said tank and its lower terminal in communication with a common conduit, means including a float valve for venting the upper terminal of each of said tubes to said tank while preventing direct fluid flow therebetween, fluid displacement means including a piston reciprocably slidable within a cylinder in float-controlled communication with each said tube through said common conduit and with the contents of said storage tank, said piston including a by-pass valve operative at the at rest condition of the piston at an end of said cylinder to open and thereby equalize the levels of the liquids inside and outside said tubes, and means operatively connected to said displacement means dependent upon the total fluid volume displaced in said plurality of tubes for indicating the contents of said storage tank.

15. In an indicating system for a storage tank, tube means extending from a lower portion to an upper portion of said tank, valve means at the upper and lower portions of said tube means, float means disposed within said tube means movable with the liquid level therein arranged for closing either of said valve means when reached by the level of the liquid within said tube means, displacement means in fluid communication with the lower portion of said tank and with the lower portion of said tube means for raising the level of the liquid within said tube means, said displacement means containing equalization means for allowing the liquid in said tube means to reach the level of the liquid in the surrounding tank, and means actuated by the closing of the upper valve means by said float means when said tube means is filled by the liquid from said displacement means for indicating the liquid level within said tank by the extent of movement of said displacement means.

16. In an indicating system for a storage tank, tube means extending from a lower portion to an upper portion of said tank, the said tube means being open to the interior of said tank at said upper portion, valve means at the upper and lower portions of said tube means, float means disposed within said tube means movable with the liquid level therein arranged for closing either of said valve means when reached by the level of the liquid within said tube means, displacement means including a valved piston reciprocable within a cylinder in fluid communication with the lower portion of said tank and with the lower portion of said tube means, power means operatively connected to said piston for raising the level of the liquid within said tube means upon movement of said valved piston in a first direction, and indicating means actuated by the closing of the upper valve means by said float means for indicating the liquid level within said tank by the extent of movement of said valved piston of said displacement means in said first direction, said valved piston arranged to permit return of the liquid within said tube means to the level within said tank by equalization of pressure and liquid flow through said piston upon the return of said piston of said displacement means to an initial position of said piston at rest against an end of said cylinder at which the valve of said piston is caused to open.

References Cited in the file of this patent

UNITED STATES PATENTS

| | | |
|---|---|---|
| 1,830,116 | Kruft | Nov. 3, 1931 |
| 2,168,106 | Saur | Aug. 1, 1939 |

FOREIGN PATENTS

| | | |
|---|---|---|
| 853,853 | France | Dec. 16, 1939 |
| 853,933 | France | Dec. 23, 1939 |